(12) United States Patent
Kim et al.

(10) Patent No.: US 9,103,318 B2
(45) Date of Patent: Aug. 11, 2015

(54) SYSTEM AND METHOD FOR CORRECTING NACELLE WIND VELOCITY OF WIND POWER GENERATOR

(75) Inventors: Kihyun Kim, Daejeon (KR); Chanhee Son, Seongnam-si (KR); Inchul Ha, Geoje-si (KR); Jeongsang Lee, Geoje-si (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 192 days.

(21) Appl. No.: 14/000,602

(22) PCT Filed: Aug. 1, 2011

(86) PCT No.: PCT/KR2011/005661
§ 371 (c)(1),
(2), (4) Date: Aug. 20, 2013

(87) PCT Pub. No.: WO2012/115313
PCT Pub. Date: Aug. 30, 2012

(65) Prior Publication Data
US 2013/0320676 A1    Dec. 5, 2013

(30) Foreign Application Priority Data
Feb. 21, 2011    (KR) .................. 10-2011-0015194

(51) Int. Cl.
*F03D 7/00* (2006.01)
*F03D 7/04* (2006.01)
(Continued)

(52) U.S. Cl.
CPC *F03D 7/00* (2013.01); *F03D 7/043* (2013.01); *F03D 11/0091* (2013.01); *G01P 5/00* (2013.01);
(Continued)

(58) Field of Classification Search
CPC ........ F03D 9/009; Y02E 10/723; Y02E 10/70
USPC ...................................... 290/44, 55
See application file for complete search history.

(56) References Cited

U.S. PATENT DOCUMENTS 6,940,185 B2 *   9/2005   Andersen et al. ............... 290/44
7,352,076 B1 *   4/2008   Gabrys ......................... 290/44
(Continued)

FOREIGN PATENT DOCUMENTS

EP        2128438 A2      12/2009
JP        11-093824 A     4/1999
(Continued)

OTHER PUBLICATIONS
International Search Report dated Feb. 27, 2012 of PCT/KR2011/005661 which is the parent application—2 pages.

*Primary Examiner* — Tulsidas C Patel
*Assistant Examiner* — Sean Gugger
(74) *Attorney, Agent, or Firm* — Knobbe Martens Olson & Bear. LLP (57) ABSTRACT

A system and method for correcting a nacelle wind velocity of a wind power generator are provided. The nacelle wind velocity correction system includes: a measurement information collection unit that collects a nacelle wind velocity that is measured by a nacelle anemometer that is installed on a nacelle of the wind power generator; a wind velocity difference generator that generates nonlinear wind velocity difference information of a nacelle wind velocity on a unit basis by calculating a wind velocity difference between a standard wind velocity of a met tower that is measured for a predetermined period and the nacelle wind velocity; a correction unit that generates a nonlinear correction equation using the nacelle wind velocity and the nonlinear wind velocity difference information and that calculates a nacelle correction wind velocity according to the nonlinear correction equation; and a controller that controls an operating state of the wind power generator according to a preset cut-in speed and cut-out speed using the nacelle wind velocity.

15 Claims, 10 Drawing Sheets

(51) Int. Cl.
 *F03D 11/00* (2006.01)
 *G01P 5/00* (2006.01)

(52) U.S. Cl.
 CPC ..... *F05B 2270/32* (2013.01); *F05B 2270/3201* (2013.01); *Y02E 10/722* (2013.01); *Y02E 10/723* (2013.01)

(56) References Cited

U.S. PATENT DOCUMENTS

| | | | |
|---|---|---|---|
| 7,692,322 B2 * | 4/2010 | Wakasa et al. | 290/44 |
| 8,587,140 B2 * | 11/2013 | Egedal et al. | 290/44 |
| 8,774,949 B2 * | 7/2014 | Ou | 700/48 |
| 2009/0183576 A1 * | 7/2009 | Honhoff et al. | 73/861.85 |
| 2009/0241659 A1 * | 10/2009 | Yoshida et al. | 73/170.07 |
| 2009/0299780 A1 | 12/2009 | Sarkar et al. | |
| 2010/0301606 A1 * | 12/2010 | Hashimoto et al. | 290/44 |
| 2012/0161444 A1 * | 6/2012 | Tarnowski | 290/44 |
| 2014/0186177 A1 * | 7/2014 | Bohme et al. | 416/1 |

FOREIGN PATENT DOCUMENTS

| | | |
|---|---|---|
| KR | 10-2006-0053716 A | 5/2006 |
| KR | 10-2007-0119285 A | 12/2007 |
| KR | 10-2009-0083371 A | 8/2009 |

* cited by examiner

SYSTEM AND METHOD FOR CORRECTING NACELLE WIND VELOCITY OF WIND POWER GENERATOR

TECHNICAL FIELD

The present invention relates to a system and method for correcting a nacelle wind velocity of a wind power generator.

BACKGROUND ART

In general, when operating a wind power generator, a wind velocity and a wind direction become a very important index for general controls and stability security of the wind power generator and thus the wind direction and the wind velocity are continuously measured using an anemometer.

Figure 1:
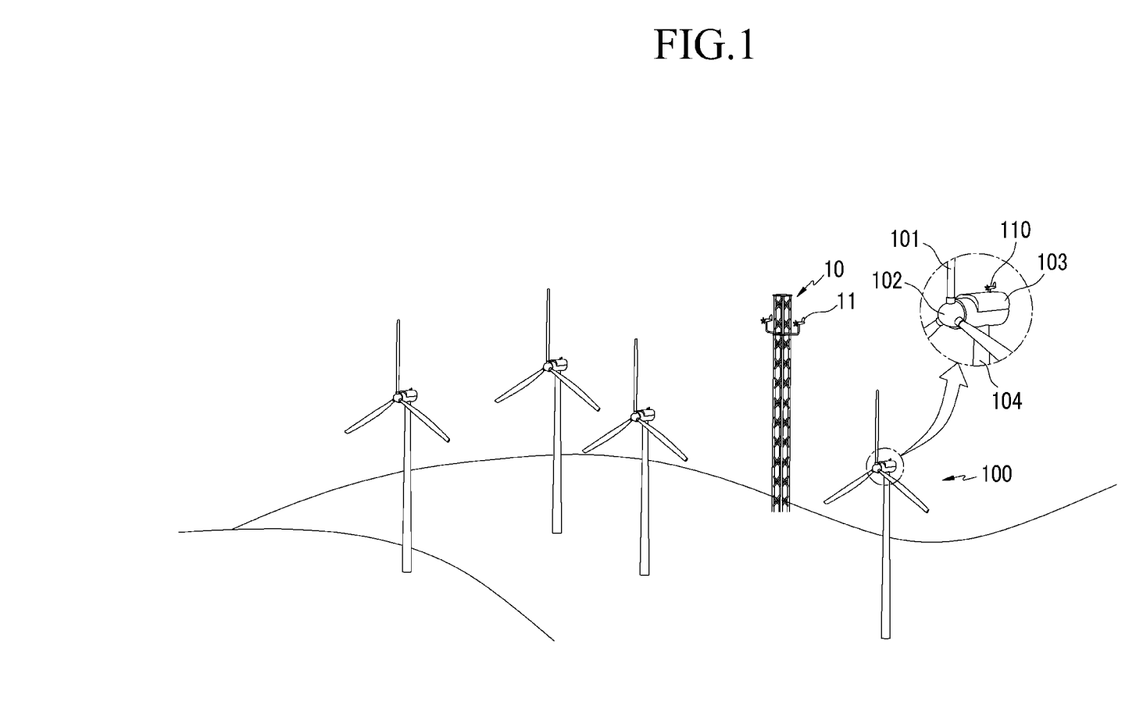
FIG. 1 illustrates an installed state of general wind power generators and a met tower.

FIG. 1 illustrates an installed state of general wind power generators and a met tower. Referring to FIG. 1, at a periphery of an installed location of wind power generators 100, a meteorological tower (met tower) is installed to measure an atmospheric state for operation of the wind power generator.

A met tower 10 includes an anemometer 11 and measures a standard wind velocity and wind direction in a wind farm in which the wind power generators 100 are installed. In this case, the measured wind velocity is used for measuring a standard wind velocity when displaying a power curve according to operation of the wind power generator 100.

Figure 2:
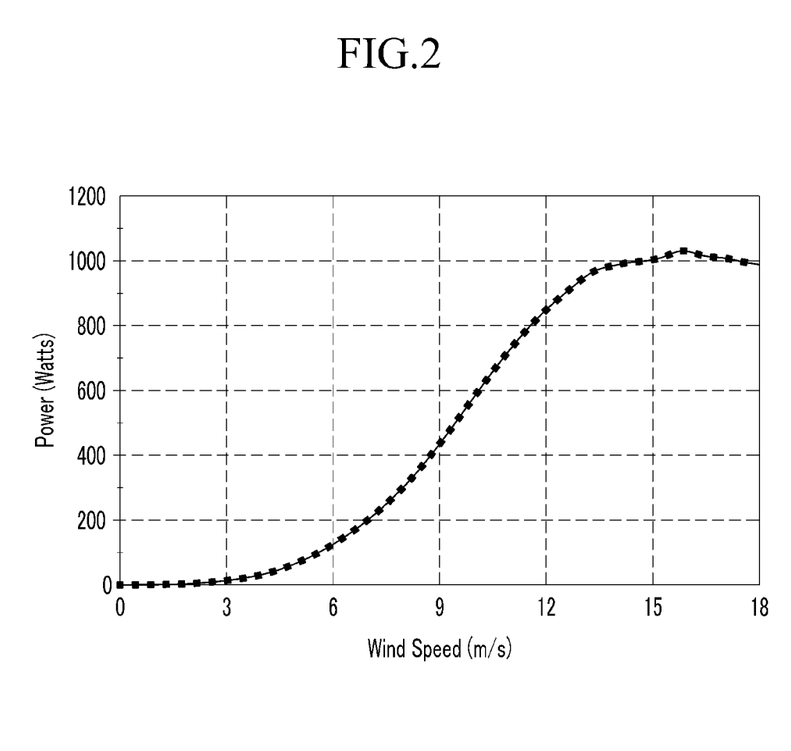
FIG. 2 is a graph illustrating a power curve that is generated based on a generally measured standard wind velocity.

FIG. 2 is a graph illustrating a power curve that is generated based on a generally measured standard wind velocity.

Referring to FIG. 2, in a power curve that is displayed by a standard wind velocity that is measured at the met tower 10, an x-axis represents a wind velocity and a y-axis represents generation power. In this case, a power curve is a most important index representing a performance of the wind power generator 100 and may be referred to as an output curved line and a performance curved line.

The wind power generator 100 is formed with a rotor blade 101, a hub 102, a nacelle 103, and a tower 104, and in this case, in an upper portion of the nacelle 103, a nacelle anemometer 110 is installed to measure a wind velocity (hereinafter, referred to as a 'nacelle wind velocity') at a location at which the wind power generator 100 is installed.

Such a nacelle wind velocity becomes a reference of a cut-in speed and a cut-out speed for driving the individual wind power generator 100.

Figure 3:
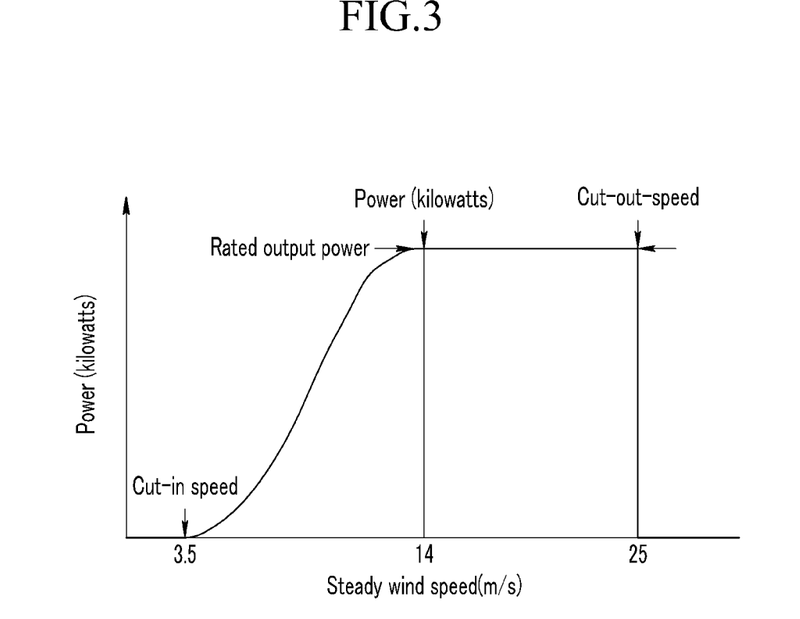
FIG. 3 is a graph illustrating setting of a cut-in speed and a cut-out speed of a general wind power generator.

FIG. 3 is a graph illustrating setting of a cut-in speed and a cut-out speed of a general wind power generator.

FIG. 3 illustrates a power curve of a general wind power generator 100. In FIG. 3, a cut-in speed represents a cut-in speed in which a generator actually starts to operate, and a cut-out speed represents a cut-out speed that stops a generator.

Here, because a cut-in speed is a wind velocity that starts to generate power by actually operating a generator, a low cut-in speed is good, but when the generator is operated in a very low wind velocity, generated power may be less than power in which a turbine consumes and thus the cut-in speed is generally about 3.5 m/s.

However, a cut-out speed is a wind velocity that artificially stops the wind power generator 100 in order to protect the wind power generator 100 when a wind velocity very largely increases, and each generator may set a different cut-in speed, but in order to secure stability, in a wind velocity of about 25 m/s, operation of the generator is stopped.

In this way, a cut-in speed and a cut-out speed of the wind power generator 100 is not set based on a standard wind velocity of the met tower 10 but is set based on a nacelle wind velocity that is installed in the wind power generator 100. This is because the met tower 10 is to measure a standard wind velocity and wind direction of a wind farm in which the wind power generator 100 is installed and the met tower 10 does not represent a wind velocity of the individual wind power generator 100.

Here, a nacelle wind velocity may sometimes become a reference of a power curve as well as a cut-in speed and a cut-out speed. Because the met tower 10 may not be installed in a wind force power generation region or wind velocities may be different according to an installation position/topography, a power curve may be measured using a nacelle wind velocity of each wind power generator 100.

However, a nacelle wind velocity that is measured in the nacelle anemometer 110 of the wind power generator 100 has a drawback representing a value different from a standard wind velocity that is measured in the general met tower 10 by an influence of a rotation of the rotor blade 101, a shape of the nacelle 103, and a momentary side wind of a periphery of a generator. That is, the nacelle anemometer 110 has a drawback that measures an inaccurate value when measuring a nacelle wind velocity due to an influence of an external environment like operation of the rotor blade 101 and a structure of the nacelle 103.

Figure 4:
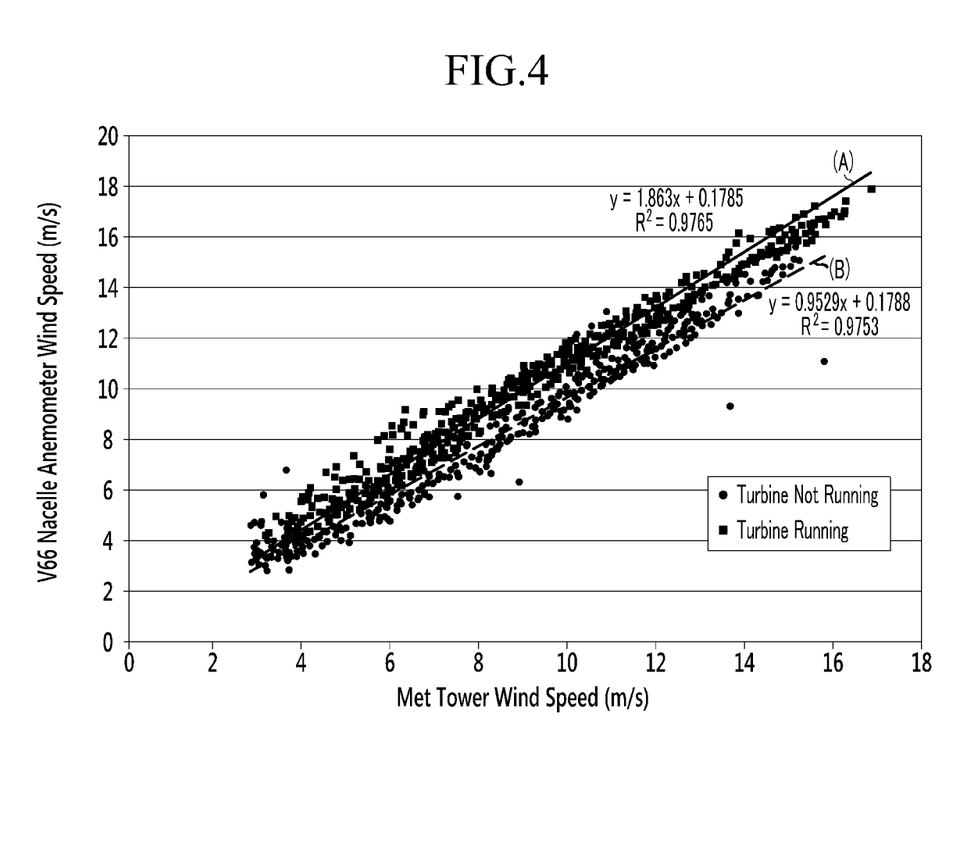
FIGS. 4 and 5 are graphs illustrating a relationship of a conventional met tower anemometer and a nacelle anemometer.
Figure 5:
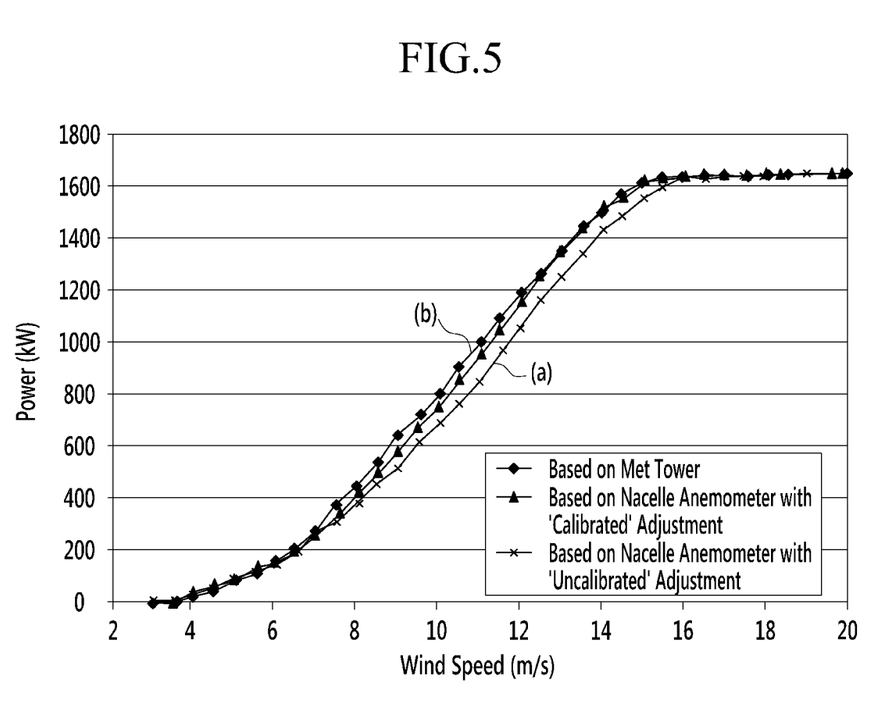

FIGS. 4 and 5 are graphs illustrating a relationship of a conventional met tower anemometer and a nacelle anemometer.

Referring to FIG. 4, when the rotor blade 101 of the wind power generator 100 rotates, a nacelle wind velocity that is measured in the nacelle anemometer 110 represents a value higher than a standard wind velocity of the met tower 10, as shown in a line A of FIG. 4. However, when the rotor blade 101 of the wind power generator 100 stops, a nacelle wind velocity that is measured in the nacelle anemometer 110 represents a value smaller than a standard wind velocity of the met tower 10, as shown in a line B of FIG. 4.

In such a situation, when the rotor blade 101 rotates, i.e., when the wind power generator 100 generates power, a nacelle wind velocity is larger than a standard wind velocity of the met tower 10 and thus when a power curve of the wind power generator 100 is output using the nacelle wind velocity, the power curve is drawn smaller than a power curve b based on a standard wind velocity of the met tower 10, as shown in a curved line a of FIG. 5. Therefore, when calculating accurate electric energy of the wind power generator 100 by a power curve, there is a problem that shows a very inaccurate result.

Further, when obtaining a cut-in speed and a cut-out speed for driving the wind power generator 100 based on an inaccurate nacelle wind, there is a problem that causes performance damage of the wind power generator 100.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a system and method for correcting a nacelle wind velocity of a wind power generator having advantages of improving a performance and stability of the wind power generator and more accurately deriving a power curve (performance curve)

by accurately catching a cut-in speed and a cut-out speed by correcting a nacelle wind velocity of the wind power generator.

Technical Solution

An exemplary embodiment of the present invention provides a nacelle wind velocity correction system of a wind power generator including: a measurement information collection unit that collects a nacelle wind velocity that is measured by a nacelle anemometer that is installed on a nacelle of the wind power generator; a wind velocity difference generator that generates nonlinear wind velocity difference information of a nacelle wind velocity on a unit basis by calculating a wind velocity difference between a standard wind velocity of a met tower that is measured for a predetermined period and the nacelle wind velocity; a correction unit that generates a nonlinear correction equation using the nacelle wind velocity and the nonlinear wind velocity difference information and that calculates a nacelle correction wind velocity according to the nonlinear correction equation; and a controller that controls an operating state of the wind power generator according to a preset cut-in speed and cut-out speed using the nacelle wind velocity.

The correction unit may generate the nonlinear correction equation into a polynomial expression of at least one of a second equation to a fifteenth equation.

The nacelle wind velocity correction system may further include a coefficient extraction unit that extracts a wind velocity difference corresponding to the nacelle wind velocity using the nonlinear wind velocity difference information, wherein the correction unit may use the nacelle wind velocity and the wind velocity difference.

The wind velocity difference generator may store a difference between a nacelle wind velocity of the nacelle anemometer and a standard wind velocity of the met tower that is measured in the same condition as that of the nacelle wind velocity at a wind velocity difference table and derive an average wind velocity difference graph with the nonlinear wind velocity difference information using the wind velocity difference table, and the average wind velocity difference graph may represent an average of a wind velocity that subtracts the nacelle wind velocity from the standard wind velocity.

The controller may derive a power curve using the nacelle correction wind velocity and calculate a power generation amount of the wind power generator using the power curve.

Another embodiment of the present invention provides a method of correcting a nacelle wind velocity of a wind power generator, the method including: generating nonlinear wind velocity difference information of a nacelle wind velocity on a unit basis by calculating a wind velocity difference between a standard wind velocity of a met tower that is measured for a predetermined period and a nacelle wind velocity that is measured by a nacelle anemometer that is installed on a nacelle of the wind power generator; collecting a nacelle wind velocity that is measured by the nacelle anemometer; generating a nonlinear correction equation using the nacelle wind velocity and the nonlinear wind velocity difference information and calculating a nacelle correction wind velocity according to the nonlinear correction equation; and controlling an operating state of the wind power generator according to a preset cut-in speed and cut-out speed using the nacelle correction wind velocity.

The generating of nonlinear wind velocity difference information may include storing a nonlinear wind velocity difference between a nacelle wind velocity of the nacelle anemometer and a standard wind velocity of the met tower that is measured in the same position condition as that of the nacelle wind velocity in a predetermined unit at a wind velocity difference table; and generating an average wind velocity difference graph using the wind velocity difference table, wherein the average wind velocity difference graph may represent an average of a wind velocity difference that subtracts the nacelle wind velocity from the standard wind.

The generating of a nonlinear correction equation may include extracting a wind velocity difference corresponding to the collected nacelle wind velocity using the average wind velocity difference graph; and generating the nonlinear correction equation using the extracted wind velocity difference and the collected nacelle wind velocity.

The method may further include deriving a power curve using the nacelle correction wind velocity and calculating a power generation amount of the wind power generator using the derived power curve, after the generating of a nonlinear correction equation.

Advantageous Effects

According to an exemplary embodiment of the present invention, by correcting a nacelle wind velocity to correspond to a standard wind velocity of a met tower, a cut-in speed and a cut-out speed can be accurately measured. By accurately measuring the cut-in speed and the cut-out speed, performance damage of the wind power generator can be prevented.

Further, by deriving a power curve using a nacelle correction wind velocity that is corrected to be closer to a standard wind velocity, electric energy can be more accurately calculated, compared with when deriving a power curve using an existing nacelle wind velocity.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, a system and a method for correcting a nacelle wind velocity of a wind power generator according to an exemplary embodiment of the present invention will be described in detail with reference to the drawings.

As described above, a nacelle wind velocity suggests an inaccurate result in calculation of electric energy, that is generated in the wind power generator 100 and makes difficult to accurately determine a cut-in speed (e.g., 3.5 m/s) and a cut-out speed (e.g., 25 m/s) of the wind power generator 100.

That is, when the wind power generator 100 is stopped, the nacelle anemometer 110 measures a nacelle wind velocity lower than a standard wind velocity and thus even if the nacelle wind velocity become an actual cut-in speed (3.5 m/s), the wind power generator 100 may miss starting (operation) timing and in this case, power generation performance damage may be caused.

Further, when the wind power generator 100 operates, the nacelle anemometer 110 measures a nacelle wind velocity higher than a standard wind velocity, and thus even if the nacelle wind velocity does not become an actual cut-out speed 25 m/s, the nacelle anemometer 110 determines that the nacelle wind velocity arrives an actual cut-out speed 25 m/s and thus by stopping operation of the wind power generator 100, power generation performance damage may be caused.

Therefore, by corresponding a nacelle wind velocity to a standard wind velocity that is measured in the met tower 10 or by correcting a nacelle wind velocity to be closer to a standard wind velocity that is measured in the met tower 10, the wind power generator 100 can be controlled without performance damage. Additionally, a power curve can be more accurately displayed.

A linear correction method as an example of a method of correcting a nacelle wind velocity will be described.

Figure 6:
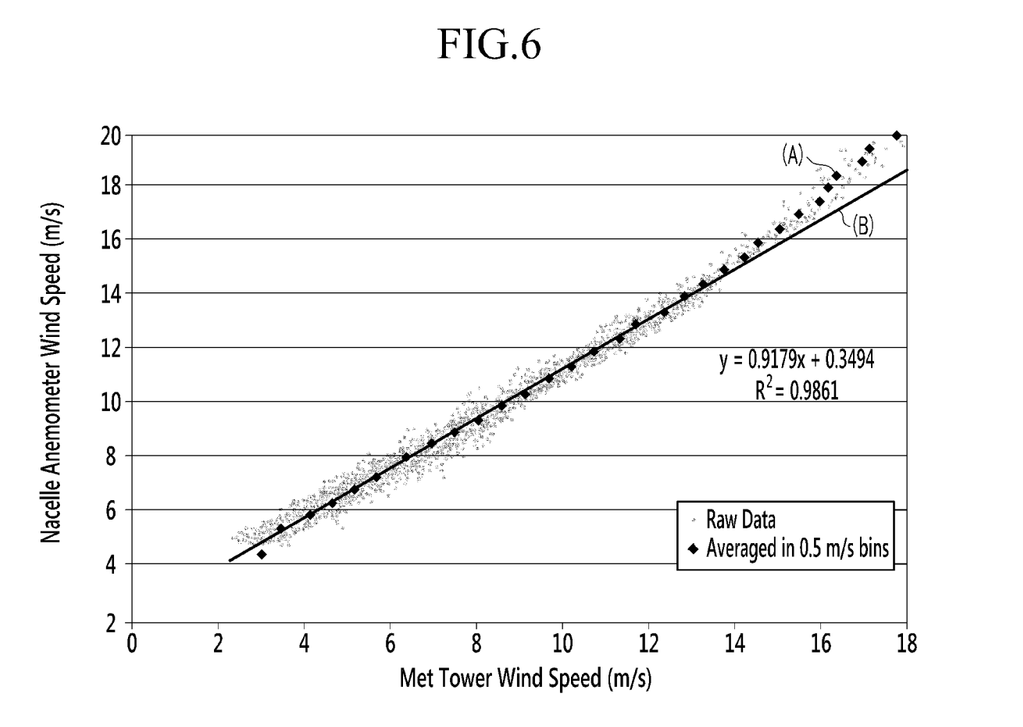
FIG. 6 is a graph illustrating a result according to linear correction of a general nacelle wind velocity.

FIG. 6 is a graph illustrating a result according to linear correction of a general nacelle wind velocity.

FIG. 6 shows a result that linearly regards and corrects a wind velocity difference between a nacelle wind velocity and a standard wind velocity of the met tower 10. That is, as shown in FIG. 6, y=0.9197x+0.3494 is obtained by linearly regarding and correcting a wind velocity difference between a nacelle wind velocity and a standard wind velocity and because a linearly corrected straight line A does not follow a dotted line B of an average wind velocity, when a wind velocity is high, a result in which a correction equation does not accurately reflect a wind velocity difference is suggested.

Figure 7:
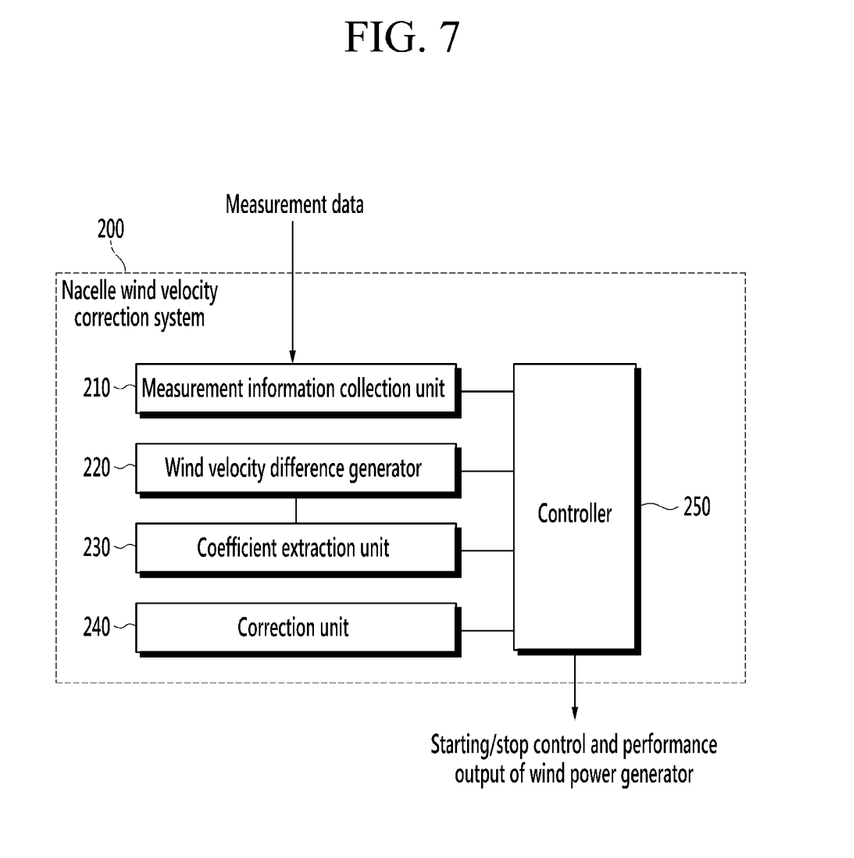
FIG. 7 is a block diagram illustrating a nacelle wind velocity correction system of a wind power generator according to an exemplary embodiment of the present invention.

FIG. 7 is a block diagram illustrating a nacelle wind velocity correction system of a wind power generator according to an exemplary embodiment of the present invention.

Referring to FIG. 7, a nacelle wind velocity correction system 200 according to an exemplary embodiment of the present invention includes a measurement information collection unit 210, a wind velocity difference generator 220, a coefficient extraction unit 230, a correction unit 240, and a controller 250.

The measurement information collection unit 21Q is connected to the nacelle anemometer 110 that is installed on a nacelle and collects a nacelle wind velocity according to an operating state (stop/operation) of the wind power generator 100 from the nacelle anemometer 110. Further, when the measurement information collection unit 210 is connected to the met tower 10, the measurement information collection unit 210 may collect a standard wind velocity.

The wind velocity difference generator 220 generates a table that calculates a wind velocity difference between a nacelle wind velocity and a standard wind velocity using a nacelle wind velocity that is measured in the wind power generator 100 for a predetermined period (e.g., 1 month) for correction of a nacelle wind velocity and a standard wind velocity that is measured in the met tower 10.

Figure 8:
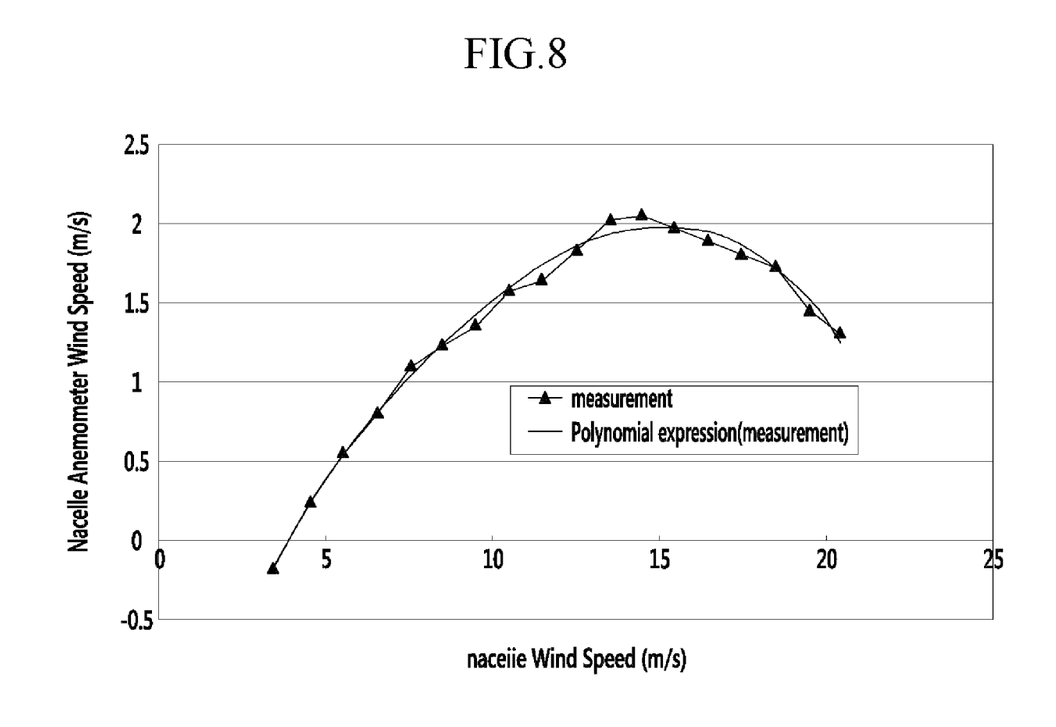
FIG. 8 is a graph illustrating a nacelle wind velocity and an average wind velocity difference thereof according to an exemplary embodiment of the present invention.

In this case, the wind velocity difference generator 220 stores a difference between a nacelle wind velocity of the nacelle anemometer 110 and a standard wind velocity of the met tower 10 that is measured in the same condition (time, position, and height) as that of the nacelle wind velocity at a wind velocity difference table and derives an average wind velocity difference graph of the nacelle wind velocity based on the wind velocity difference table, as shown in FIG. 8. Hereinafter, the wind velocity difference table and the wind velocity difference graph are related information and are referred to as wind velocity difference information, for convenience of description.

FIG. 8 is a graph illustrating a nacelle wind velocity and an average wind velocity difference thereof according to an exemplary embodiment of the present invention.

Referring to FIG. 8, an x-axis represents a nacelle wind velocity and a y-axis represents an average value of a wind velocity difference that subtracts the nacelle wind velocity from a standard wind velocity of the met tower 10.

In more detail, an average wind velocity difference graph of FIG. 8 that is derived from a wind velocity difference table of a nacelle wind velocity represents a nonlinear wind velocity difference between a nacelle wind velocity that is averaged with a gap of 1 m/s and a standard wind velocity of the met tower 10 that is measured in the nacelle wind velocity.

For example, when a nacelle wind velocity is 5 m/s-6 m/s, an average of data of the nacelle wind velocity that has been measured for 1 month in a 1 second unit is about 5.5 m/s, and when a difference between a standard wind velocity of the met tower 10 and a nacelle wind velocity at the nacelle wind velocity is obtained with the same method, a graph of FIG. 8 may be derived.

The coefficient extraction unit 230 extracts a corresponding wind velocity difference based on a nacelle wind velocity that is collected by the measurement information collection unit 210 from previously stored wind velocity difference information (e.g., a wind velocity difference table or a wind velocity difference graph of FIG. 8).

The correction unit 240 determines a wind velocity difference that is extracted from the coefficient extraction unit 230 as coefficient information and calculates a nacelle correction wind velocity closer to a standard wind velocity based on a nonlinear correction equation and a nacelle wind velocity that is collected by the measurement information collection unit 210.

Hereinafter, a method in which the correction unit 240 calculates a correction wind velocity closer to a standard wind velocity based on a nonlinear correction equation will be described.

Referring again to FIG. 8, an x-axis of the average wind velocity difference graph represents a nacelle wind velocity, and a y-axis thereof represents a wind velocity difference that subtracts the nacelle wind velocity from a standard wind velocity of the met tower 10, and thus this may be represented by Equation 1.

standard wind velocity−nacelle wind velocity=f(wind velocity difference) (Equation 1)

In order to correct a nacelle wind velocity to be closer to a standard wind velocity, Equation 1 is arranged to Equation 2.

nacelle correction velocity=f(wind velocity difference)+nacelle wind velocity (Equation 2)

Equation 2 obtains a standard wind velocity of the met tower 10 using only a nacelle wind velocity that is measured in the wind power generator 100. Here, the obtained nacelle correction wind velocity may not be completely the same as the standard wind velocity, but represents a value that is corrected to be closer to the standard wind velocity.

The correction unit 240 may represent f (wind velocity difference) that is represented in Equations 1 and 2 with a second expression to a high order (e.g., fifteenth) polynomial expression, and for example, when a graph of FIG. 8 is arranged with a fourth equation, Equation 3 is obtained.

$V_n' = a_4 V_n^4 + a_3 V_n^3 + a_2 V_n^2 + a_1 V_n + V_n$ (Equation 3)

where $V_n'$ is a nacelle correction wind velocity, and $V_n$ is a nacelle wind velocity.

A coefficient a is a value that is derived from an average wind velocity difference graph (or a wind velocity difference table) of FIG. 8 of a wind velocity difference between a nacelle wind velocity and a standard wind velocity from an actually measured nacelle wind velocity value. When a1 to a4 are determined from such an actually measured nacelle wind velocity, almost the same result between a nacelle correction wind velocity and a standard wind velocity may be obtained, as shown in FIG. 9.

Here, because the coefficient a may be different according to a model of the wind power generator 100, the coefficient a is derived based on measured data after the wind power generator 100 is installed.

Figure 9:
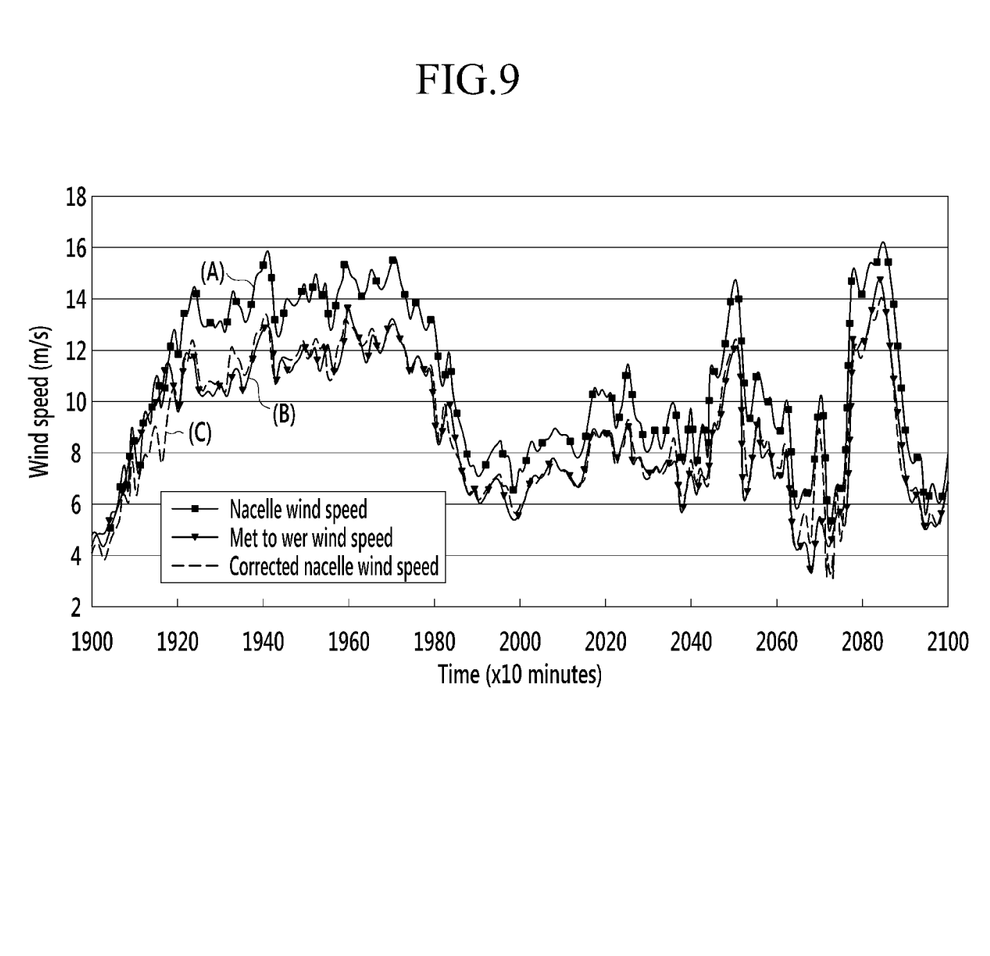
FIG. 9 is a graph illustrating a result in which a nacelle correction wind velocity and a standard wind velocity correspond according to an exemplary embodiment of the present invention.

FIG. 9 is a graph illustrating a result in which a nacelle correction wind velocity and a standard wind velocity correspond according to an exemplary embodiment of the present invention.

Referring to FIG. 9, the correction unit 240 obtains a coefficient from an average wind velocity difference graph (or a wind velocity difference table) of FIG. 8 based on an actually measured nacelle wind velocity and obtains a result that a nonlinearly corrected nacelle correction wind velocity is similar to a standard wind velocity based on Equation 3in which the f (wind velocity difference) is arranged with a fourth equation.

That is, an uppermost solid line A is a nacelle wind velocity, and a solid line C is a nacelle correction wind velocity and corresponds to a standard wind velocity B of the met tower 10 and verifies the derived correction equation. Therefore, by more accurately correcting a cut-in speed and a cut-out speed using a nacelle correction wind velocity, performance damage of the wind power generator 100 can be reduced.

The controller 250 corrects a measured nacelle wind velocity and controls general operations for operation of the wind power generator 100 using the corrected nacelle correction wind velocity.

The controller 250 sets a cut-in speed and a cut-out speed using a nacelle correction wind velocity that is calculated in the correction unit 240 and thus controls whether to operate the wind power generator 100.

Further, as the controller 250 derives a power curve using the nacelle correction wind velocity, even when the controller 250 measures a performance of the wind power generator 100, the same result as or a result very similar to that using a standard wind velocity of the met tower 10 is obtained.

Figure 10:
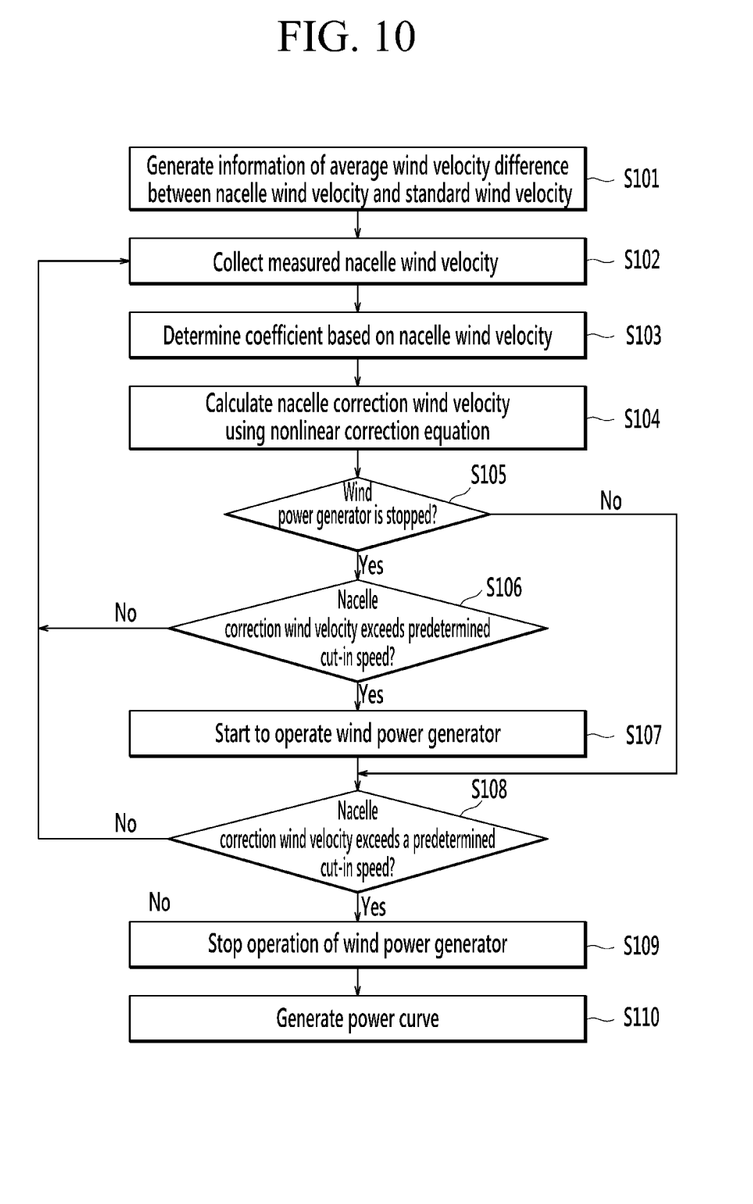
FIG. 10 is a flowchart illustrating a method of correcting a nacelle wind velocity of a wind power generator according to an exemplary embodiment of the present invention.

FIG. 10 is a flowchart illustrating a method of correcting a nacelle wind velocity of a wind power generator according to an exemplary embodiment of the present invention.

Internal constituent elements of the nacelle wind velocity correction system 200 of a wind power generator according to an exemplary embodiment of the present invention that is described with reference to FIG. 9 are subdivided in a function unit or are integrated on a function basis regardless of a name thereof to form various constituent elements. Hereinafter, a method of correcting a nacelle wind velocity according to an exemplary embodiment of the present invention will be described using the nacelle wind velocity correction system 200.

Referring to FIG. 10, the nacelle wind velocity correction system 200 of a wind power generator according to an exemplary embodiment of the present invention stores a nonlinear wind velocity difference with a standard wind velocity of the met tower 10 that is measured in the same position condition as that of a nacelle wind velocity of the nacelle anemometer 110 in a predetermined unit for a predetermined period at a wind velocity difference table and generates an average wind velocity difference graph representing an average value of a wind velocity difference that subtracts the nacelle wind velocity from the standard wind velocity based on the wind velocity difference table (S101).

The nacelle wind velocity correction system 200 collects a nacelle wind velocity that is measured by the nacelle anemometer 110 (S102). The nacelle wind velocity correction system 200 determines a wind velocity difference that is extracted from wind velocity difference information (wind velocity difference table/wind velocity difference graph) to a coefficient based on the collected nacelle wind velocity (S103), generates a nonlinear correction equation from a second equation to a fifteenth equation, and calculates a nacelle correction wind velocity using the nonlinear correction equation (S104).

The nacelle wind velocity correction system 200 determines whether the wind power generator 100 is stopped (S105), and if the wind power generator 100 is stopped, the nacelle wind velocity correction system 200 determines whether the nacelle correction wind velocity exceeds a predetermined cut-in speed (S106), and if the nacelle correction wind velocity exceeds a predetermined cut-in speed, the nacelle wind velocity correction system 200 operates the wind power generator 100 (8107), and if the nacelle correction wind velocity does not exceed a predetermined cut-in speed, the nacelle wind velocity correction system 200 maintains a stop state of the wind power generator 100 and returns to step S102.

If the wind power generator 100 is not stopped at step S105, the nacelle wind velocity correction system 200 determines whether the nacelle correction wind velocity exceeds a predetermined cut-in speed (S108), and if the nacelle correction wind velocity exceeds a predetermined cut-in speed, the nacelle wind velocity correction system 200 stops operation of the wind power generator 100 (S109), and if the nacelle correction wind velocity does not exceed a predetermined cut-in speed, the nacelle wind velocity correction system 200 maintains an operating state of the wind power generator 100 and returns to step S102.

Further, the nacelle wind velocity correction system 200 stores the sequentially corrected nacelle correction wind velocity and generates a power curve based on the nacelle correction wind velocity (S110).

In this way, the nacelle wind velocity correction system 200 of the wind power generator 100 according to an exemplary embodiment of the present invention corrects a nacelle wind velocity to correspond to a standard wind velocity of the met tower 10 through a nonlinear correction equation using an average wind velocity difference between a nacelle wind velocity and a standard wind velocity, thereby accurately measuring a cut-in speed and a cut-out speed. By accurately catching the cut-in speed and the cut-out speed, performance damage of the wind power generator 100 can be prevented.

Further, by deriving a power curve using a nacelle correction wind velocity that is corrected to be closer to a standard wind velocity, electric energy can be more accurately calculated, compared with when deriving a power curve using a nacelle wind velocity.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

A nacelle wind velocity correction system according to an exemplary embodiment of the present invention accurately measures a cut-in speed and a cut-out speed by correcting a nacelle wind velocity of a wind power generator to correspond to a standard wind velocity of a met tower, thereby preventing performance damage of the wind power generator. A nacelle wind velocity correction system according to an exemplary embodiment of the present invention can more accurately calculate electric energy, compared with when deriving a power curve of a wind power generator using an existing nacelle wind velocity by deriving a power curve of a wind power generator using a nacelle correction wind velocity that is corrected to be closer to a standard wind velocity.

The invention claimed is:

1. A nacelle wind velocity correction system of a wind power generator, the nacelle wind velocity correction system comprising:
   a measurement information collection unit that collects a nacelle wind velocity that is measured by a nacelle anemometer that is installed on a nacelle of the wind power generator;
   a wind velocity difference generator that generates nonlinear wind velocity difference information of a nacelle wind velocity on a unit basis by calculating a wind velocity difference between a standard wind velocity of a met tower that is measured for a predetermined period and the nacelle wind velocity;
   a correction unit that generates a nonlinear correction equation using the nacelle wind velocity and the nonlinear wind velocity difference information and that calculates a nacelle correction wind velocity according to the nonlinear correction equation; and
   a controller that controls an operating state of the wind power generator according to a preset cut-in speed and cut-out speed using the nacelle wind velocity.

2. The nacelle wind velocity correction system of claim 1, wherein the correction unit generates the nonlinear correction equation into a polynomial expression of at least one of a second equation to a fifteenth equation.

3. The nacelle wind velocity correction system of claim 1, further comprising a coefficient extraction unit that extracts a wind velocity difference corresponding to the nacelle wind velocity using the nonlinear wind velocity difference information,
   wherein the correction unit uses the nacelle wind velocity and the wind velocity difference.

4. The nacelle wind velocity correction system of claim 1, wherein the wind velocity difference generator stores a difference between a nacelle wind velocity of the nacelle anemometer and a standard wind velocity of the met tower that is measured in the same condition as that of the nacelle wind velocity at a wind velocity difference table and derives an average wind velocity difference graph with the nonlinear wind velocity difference information using the wind velocity difference table, and
   the average wind velocity difference graph represents an average of a wind velocity that subtracts the nacelle wind velocity from the standard wind velocity.

5. The nacelle wind velocity correction system of claim 1, wherein the controller derives a power curve using the nacelle correction wind velocity and calculates a power generation amount of the wind power generator using the power curve.

6. A method of correcting a nacelle wind velocity of a wind power generator, the method comprising:
   generating nonlinear wind velocity difference information of a nacelle wind velocity on a unit basis by calculating a wind velocity difference between a standard wind velocity of a met tower that is measured for a predetermined period and a nacelle wind velocity that is measured by a nacelle anemometer that is installed on a nacelle of the wind power generator;
   collecting a nacelle wind velocity that is measured by the nacelle anemometer;
   generating a nonlinear correction equation using the nacelle wind velocity and the nonlinear wind velocity difference information and calculating a nacelle correction wind velocity according to the nonlinear correction equation; and
   controlling an operating state of the wind power generator according to a preset cut-in speed and cut-out speed using the nacelle correction wind velocity.

7. The method of claim 6, wherein the generating of nonlinear wind velocity difference information comprises
   storing a nonlinear wind velocity difference between a nacelle wind velocity of the nacelle anemometer and a standard wind velocity of the met tower that is measured in the same position condition as that of the nacelle wind velocity in a predetermined unit at a wind velocity difference table; and
   generating an average wind velocity difference graph using the wind velocity difference table, wherein the average wind velocity difference graph represents an average of a wind velocity difference that subtracts the nacelle wind velocity from the standard wind.

8. The method of claim 7, wherein the generating of a nonlinear correction equation comprises
extracting a wind velocity difference corresponding to the collected nacelle wind velocity using the average wind velocity difference graph; and
generating the nonlinear correction equation using the extracted wind velocity difference and the collected nacelle wind velocity.

9. The method of claim 6, further comprising deriving a power curve using the nacelle correction wind velocity and calculating a power generation amount of the wind power generator using the derived power curve, after the generating of a nonlinear correction equation.

10. The method of claim 7, further comprising deriving a power curve using the nacelle correction wind velocity and calculating a power generation amount of the wind power generator using the derived power curve, after the generating of a nonlinear correction equation.

11. The method of claim 8, further comprising deriving a power curve using the nacelle correction wind velocity and calculating a power generation amount of the wind power generator using the derived power curve, after the generating of a nonlinear correction equation.

12. The nacelle wind velocity correction system of claim 2, wherein the wind velocity difference generator stores a difference between a nacelle wind velocity of the nacelle anemometer and a standard wind velocity of the met tower that is measured in the same condition as that of the nacelle wind velocity at a wind velocity difference table and derives an average wind velocity difference graph with the nonlinear wind velocity difference information using the wind velocity difference table, and
the average wind velocity difference graph represents an average of a wind velocity that subtracts the nacelle wind velocity from the standard wind velocity.

13. The nacelle wind velocity correction system of claim 3, wherein the wind velocity difference generator stores a difference between a nacelle wind velocity of the nacelle anemometer and a standard wind velocity of the met tower that is measured in the same condition as that of the nacelle wind velocity at a wind velocity difference table and derives an average wind velocity difference graph with the nonlinear wind velocity difference information using the wind velocity difference table, and
the average wind velocity difference graph represents an average of a wind velocity that subtracts the nacelle wind velocity from the standard wind velocity.

14. The nacelle wind velocity correction system of claim 2, wherein the controller derives a power curve using the nacelle correction wind velocity and calculates a power generation amount of the wind power generator using the power curve.

15. The nacelle wind velocity correction system of claim 3, wherein the controller derives a power curve using the nacelle correction wind velocity and calculates a power generation amount of the wind power generator using the power curve.

* * * * *